United States Patent
Koneczny

(10) Patent No.: US 7,963,485 B2
(45) Date of Patent: Jun. 21, 2011

(54) TRIMMABLE HORIZONTAL STABILIZER

(75) Inventor: Manfred Koneczny, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 242 days.

(21) Appl. No.: 12/307,619

(22) PCT Filed: Jul. 10, 2007

(86) PCT No.: PCT/EP2007/057044
§ 371 (c)(1), (2), (4) Date: Feb. 18, 2009

(87) PCT Pub. No.: WO2008/006831
PCT Pub. Date: Jan. 17, 2008

(65) Prior Publication Data
US 2009/0289144 A1     Nov. 26, 2009

(30) Foreign Application Priority Data
Jul. 11, 2006   (DE) .................. 10 2006 032 003

(51) Int. Cl.
B64C 3/44    (2006.01)
(52) U.S. Cl. .................. 244/219; 244/201; 244/218
(58) Field of Classification Search .................. 244/219, 244/201, 218, 99.8
See application file for complete search history.

(56) References Cited

U.S. PATENT DOCUMENTS

| | | | |
|---|---|---|---|
| 3,285,540 A | 11/1966 | Lee | |
| 4,247,066 A | 1/1981 | Frost et al. | |
| 4,432,516 A * | 2/1984 | Muscatell | 244/219 |
| 4,582,278 A * | 4/1986 | Ferguson | 244/219 |
| 4,890,803 A * | 1/1990 | Smith | 244/219 |
| 5,004,189 A * | 4/1991 | Igram | 244/219 |
| 5,181,678 A * | 1/1993 | Widnall et al. | 244/219 |
| 5,288,039 A * | 2/1994 | DeLaurier et al. | 244/219 |
| 5,681,014 A * | 10/1997 | Palmer | 244/219 |
| 6,016,992 A * | 1/2000 | Kolacny | 244/12.6 |
| 6,045,096 A * | 4/2000 | Rinn et al. | 244/219 |
| 2003/0102411 A1* | 6/2003 | Kota | 244/219 |
| 2006/0237596 A1* | 10/2006 | Perez-Sanchez | 244/219 |

FOREIGN PATENT DOCUMENTS

| | | |
|---|---|---|
| EP | 0 860 355 | 8/1998 |
| EP | 1 205 383 | 5/2002 |
| WO | WO 2004/108525 | 12/2004 |

OTHER PUBLICATIONS

DE-Buch: "Messerschmitt Bolkow Blohm", 111 MBB-Flugzeuge 1913-1973, Motor Buch Verlag Stuttgart, 1 Aufl., 1973.
German office action in priority application No. 10 2006 032 003.4-22.

* cited by examiner

*Primary Examiner* — Christopher P Ellis
(74) *Attorney, Agent, or Firm* — Greer, Burns & Crain, Ltd.

(57) ABSTRACT

A trimmable horizontal stabilizer is provided adjacent to the fuselage of an aircraft and has a predetermined aerodynamic profile. A movable elevator is arranged adjacent to the horizontal stabilizer. The horizontal stabilizer has a load-bearing structure which extends in the span direction and is firmly connected to the fuselage of the aircraft, and movable areas which are connected to the load-bearing structure such that they can move and can be moved independently of the elevator in order to trim the horizontal stabilizer by varying the aerodynamic profile.

20 Claims, 4 Drawing Sheets

TRIMMABLE HORIZONTAL STABILIZER

FIELD OF THE INVENTION

The invention relates to a trimmable horizontal stabilizer, which is providable adjacent to a fuselage of an aircraft and has a predetermined aerodynamic profile, and adjacent to which a movable elevator is arranged.

BACKGROUND OF THE INVENTION

As is known, horizontal stabilizers are used to stabilize the attitude of an aircraft and to control it about its lateral axis, the latter with the aid of an aileron, which is provided on the horizontal stabilizer. Furthermore, the aileron is trimmed in order to set the desired attitude, corresponding to the pitch angle of the aircraft, for take-off, climbing flight, cruise flight, landing approach and landing, as well as, for example, for a rapid descent in an emergency. In present-day designs of commercial airliners and transport aircraft, the horizontal stabilizer is arranged at the aft end of the aircraft fuselage.

In order to set the pitch angle as explained above, the horizontal stabilizer can be trimmed such that it selectively produces positive or negative lift, or is neutral. Conventional horizontal stabilizers can for this purpose be moved about an axis running parallel to the aircraft lateral axis, so that they can be trimmed over a predetermined angle range of, for example, +3° to −15°. In this case, angles with a positive mathematical sign, such as +3°, mean trimming of the horizontal stabilizer in the aircraft longitudinal direction (X) seen from above, which is associated with an increase in the positive lift of the horizontal stabilizer, and thus with rotation of the aircraft about its lateral axis in the sense of reducing the pitch angle, while angles with a negative mathematical sign, such as −15°, mean trimming of the horizontal stabilizer downwards, so that the horizontal stabilizer produces negative lift, thus resulting in an increase in the pitch angle of the aircraft. In the case of conventional horizontal stabilizers, the magnitude and direction of the aerodynamic force is produced, that is to say positive lift or negative lift, is varied by varying the incidence angle of the horizontal stabilizer. In the case of conventional horizontal stabilizers, the trimming is typically carried out by means of a spindle drive, which acts on the rearward end of the horizontal stabilizer, which is mounted, connected by hinges such that it can rotate about the lateral axis of the aircraft, at its front end.

SUMMARY OF THE INVENTION

It is one of the objects of the invention to provide an improved trimmable horizontal stabilizer.

Accordingly, a trimmable horizontal stabilizer is presented, which is providable adjacent to a fuselage of an aircraft and has a predetermined aerodynamic profile, and adjacent to which a movable elevator is arranged, the horizontal stabilizer comprising a load-bearing structure, which extends in the span direction and is firmly connectable to the fuselage of the aircraft, and movable areas, which are connected to the load-bearing structure such that they can be moved independently of the elevator in order to trim the horizontal stabilizer by varying the aerodynamic profile, the movable areas being arranged forward of the load-bearing structure in the aircraft longitudinal direction.

According to one embodiment of the horizontal stabilizer according to the invention, the movable areas are arranged forward of the load-bearing structure in the aircraft longitudinal direction.

According to another embodiment of the horizontal stabilizer according to the invention, the movable areas are arranged forward of and aft of the load-bearing structure in the aircraft longitudinal direction.

According to one embodiment of the invention, the load-bearing structure is in the form of a wing box which has skin surfaces, which form parts of the aerodynamic profile of the horizontal stabilizer, on its upper face and on its lower face.

In this case, the movable areas are in the form of flaps which are connected by hinges to the load-bearing structure.

The movable areas may have a rigid skin surface.

On the other hand, the movable areas may have a skin surface which merges into the skin surface of the load-bearing structure and is designed to be flexible at least at the junction with the skin surface of the load-bearing structure.

According to another embodiment of the horizontal stabilizer according to the invention, the movable areas are in the form of areas with a flexibly variable profile and have a flexible skin surface.

According to another embodiment of the invention, the movable areas can be moved by a common actuator.

According to another embodiment of the invention, the movable areas can be moved by separate actuators.

The actuators may comprise a plurality of drive stations which are coupled between the load-bearing structure and the movable areas.

According to one embodiment of the invention, the actuators comprise torsion shafts which are coupled between the drive stations and a central drive unit provided in the fuselage of the aircraft.

On the other hand, the drive stations may be coupled to individual drive units provided in the elevator.

The elevator may be provided at the rearward end of the movable area of the horizontal stabilizer, arranged aft of the load-bearing structure.

The elevator may on the other hand be provided at the rearward end of the load-bearing structure of the horizontal stabilizer.

According to one embodiment of the invention, the load-bearing structure extends as far as the outer end of the horizontal stabilizer in the span direction.

According to one embodiment of the invention, vertical stabilizers are provided at the outer ends of the horizontal stabilizer and are firmly connected to the fuselage by means of the load-bearing structure.

BRIEF DESCRIPTION OF THE DRAWINGS

The present invention is explained in more detail below using preferred exemplary embodiments and with reference to the attached figures of the drawings, in which.

In the figures, like reference numerals refer to identical or functionally identical components unless otherwise stated.

DETAILED DESCRIPTION OF THE INVENTION

Figure 1:
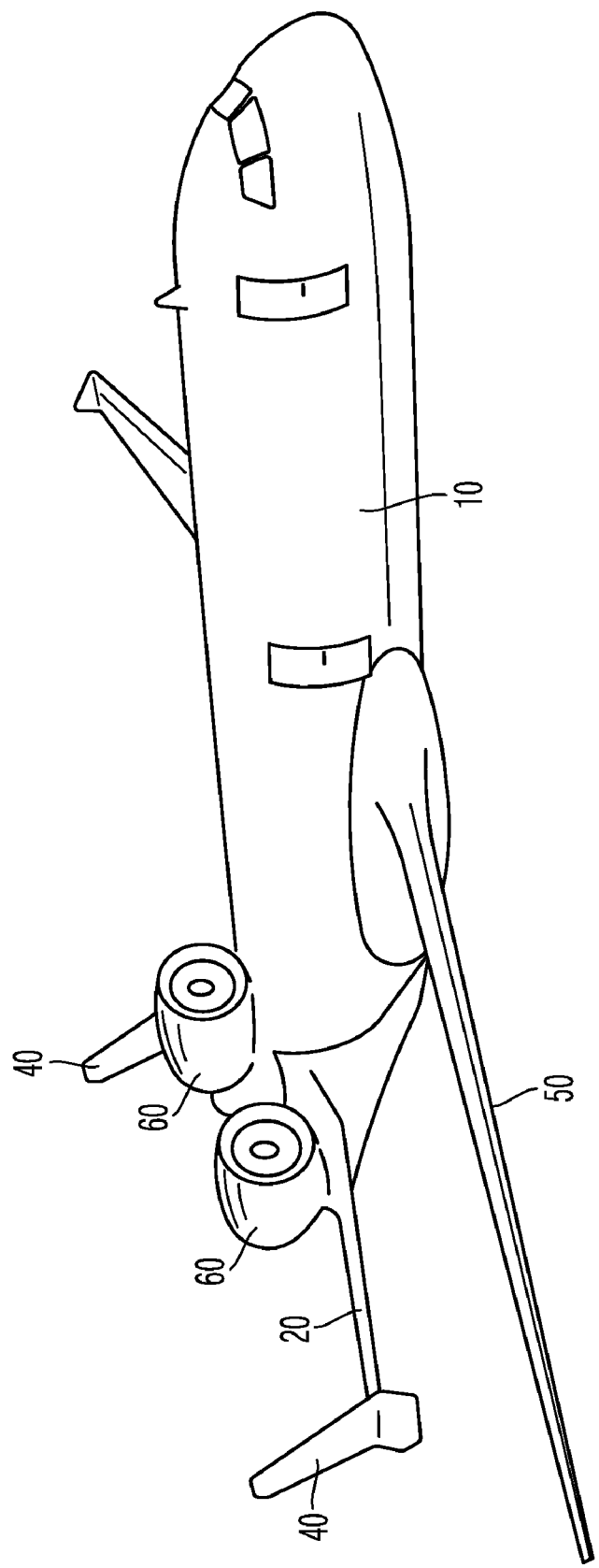
FIG. 1 shows a perspective view of a future modern short-haul aircraft, with a horizontal stabilizer designed according to one exemplary embodiment of the invention.

FIG. 1 shows an airliner of a trendsetting design, which has been designed with engines arranged on the upper face of the horizontal stabilizer 20, as part of a reduced-noise concept. The aircraft has a fuselage 10 with main planes 50 arranged in the conventional configuration, a horizontal stabilizer 20 and vertical stabilizers 40. The vertical stabilizers 40 are arranged at the outer ends of the horizontal stabilizer 20.

Figure 2A:
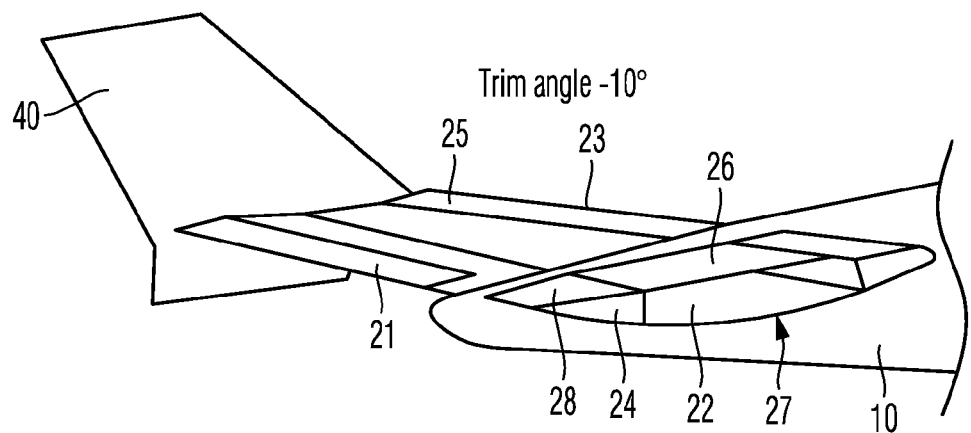
FIGS. 2a) and b) show a schematic illustration of a part of the horizontal stabilizer according to the invention, illustrated in two differently trimmed configurations, in order to explain its major components. In order to explain the method of operation, the trimmable areas are illustrated drawn into the fuselage centre as far as the same plane as the untrimmable load-bearing structure.

FIGS. 2a) and b) show the port part of the horizontal stabilizer 20 from FIG. 1 according to one exemplary embodiment of the invention, in two differently trimmed configurations. The horizontal stabilizer 20 has an aerodynamic profile which, for trimming purposes, can be varied such that it produces aerodynamic forces whose magnitudes are variable such that the horizontal stabilizer 20 selectively produces positive lift or negative lift, or is neutral. In FIGS. 2a) and b), the horizontal stabilizer 20 is illustrated with its aerodynamic profile in two configurations, which respectively correspond to a trim angle of a conventional horizontal stabilizer of −10° and +10°, respectively.

The horizontal stabilizer 20 has a load-bearing structure 22 which extends in the span direction, is in the form of a wing box in the illustrated exemplary embodiment, and is firmly connected to the fuselage 10 of the aircraft. This wing box has respective skin surfaces 26, 27 on its upper face and on its lower face, which form a part of the aerodynamic profile of the horizontal stabilizer 20.

Areas 23, 24 which form a part of the aerodynamic profile and can be moved for the purposes of the previously mentioned variation of this aerodynamic profile are arranged forward of and aft of the load-bearing structure 22 in the aircraft longitudinal direction X. These movable areas 23, 24 are connected to the load-bearing structure 22 such that they can move, and can be moved independently of an elevator 21 which, in the illustrated exemplary embodiment, is provided at the rearward end of the movable area 24, which is arranged aft of the load-bearing structure 22. In order to explain the method of operation, the trimmable areas 23, 24 are in this case illustrated drawn into the fuselage centre as far as the same plane as the untrimmable load-bearing structure, although they actually end at the outer skin of the fuselage 10. The elevator could also be arranged differently, for example by attaching it directly to the load-bearing structure 22.

In the illustrated exemplary embodiment the movable areas 23, 24 are in the form of flaps which have a rigid skin surface 25, 28 and are connected by hinges to the load-bearing structure 22, in a manner known per se.

Figure 4A:
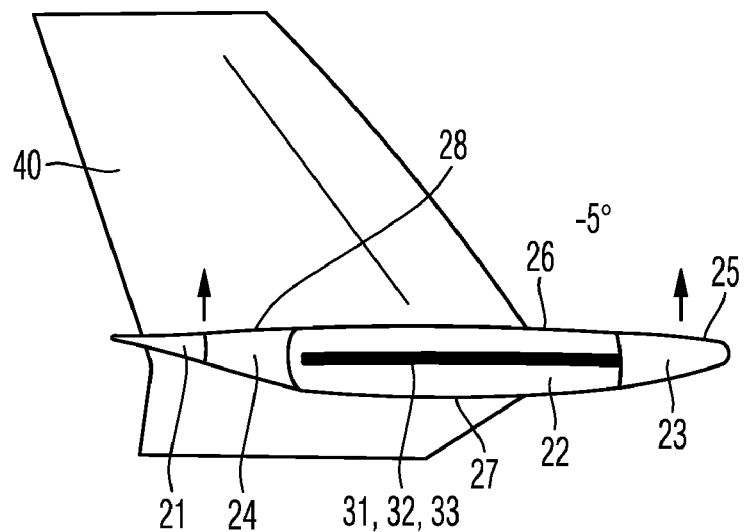
FIGS. 4a) and b) each show enlarged cross-sectional views through the trimmable horizontal stabilizer according to the exemplary embodiment of the invention, once again illustrated in two differently trimmed configurations.
Figure 4B:
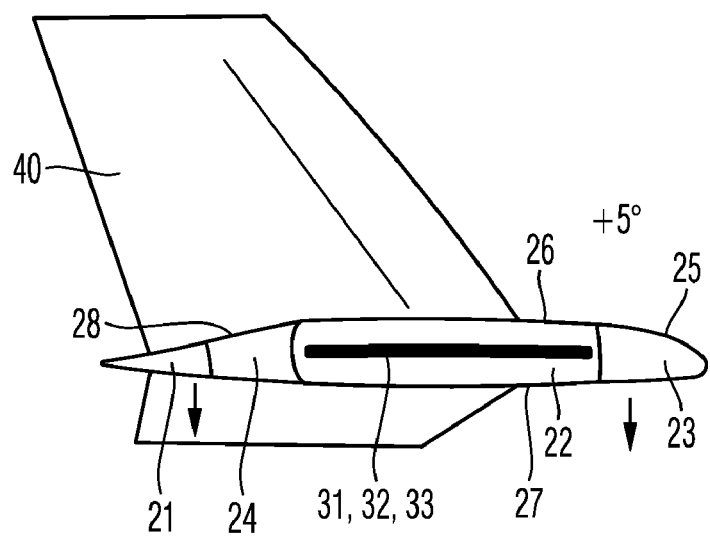

FIGS. 4a) and b) once again show the horizontal stabilizer 20, enlarged in the form of a cross-sectional view through the horizontal stabilizer 20, with the horizontal stabilizer 20 in this case being illustrated with its aerodynamic profile in two configurations, which correspond to a trim angle of a conventional horizontal stabilizer of −5° and +5°, respectively.

In the configurations illustrated in FIGS. 2a) and 4a), the horizontal stabilizer 20 is trimmed such that it produces negative lift, that is to say rotation of the aircraft about its lateral axis in the sense of increasing the pitch angle. For this purpose, the two movable areas 23, 24 are each moved upwards so that the aerodynamic profile of the horizontal stabilizer 20 has greater curvature on its lower face and less curvature on its upper face, where it virtually forms a straight line. As is known, this varies the pressure difference between the aerodynamic forces acting on the upper face and the lower face of the horizontal stabilizer 20, in the sense of a resultant negative-lift force, that is to say the lower face is the reduced-pressure side.

Figure 2B:
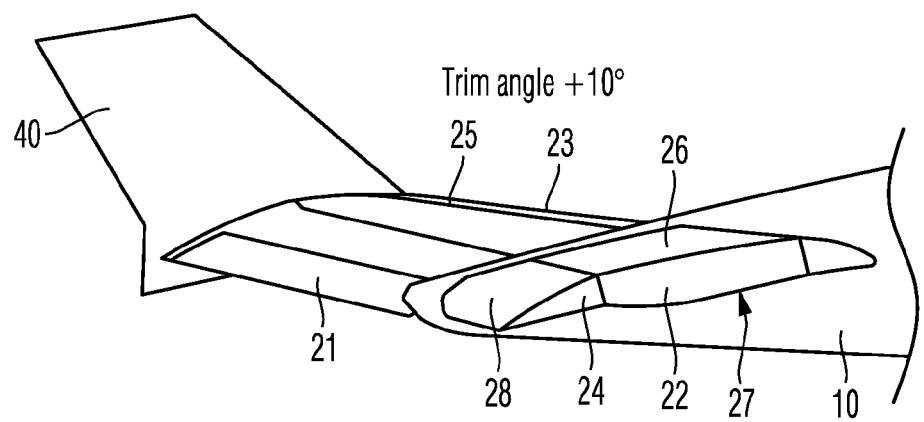

In contrast, FIGS. 2b) and 4b) show a configuration of the horizontal stabilizer 20 in which the movable areas 23, 24 have each been moved downwards, so that the aerodynamic profile has greater curvature on the upper face and less curvature on the lower face, that is to say the upper face is the reduced-pressure side, resulting in a positive aerodynamic lift force on the horizontal stabilizer 20, thus resulting in the aircraft rotating about its lateral axis, in the sense of reducing the pitch angle.

Instead of the movable areas 23, 24 being in the form of flaps with rigid skin surfaces 25, 26, the skin surfaces 25, 28 of the movable areas 23, 24 can merge into the skin surface 26, 27 on the load-bearing structure 22 or may be connected to, and may be designed to be flexible at least at the junction with or at the connection to the skin surface 26, 27 of the load-bearing structure 22.

In addition, the movable areas 23, 24 may be designed per se in the form of areas with a flexible variable profile which accordingly have a flexible skin surface 25, 28 which either merges into a rigid skin surface on a load-bearing structure 22 in the form of a wing box, or is connected to it, or else the skin surfaces 25, 26, 27, 28 may be designed to be entirely flexible.

Figure 3A:
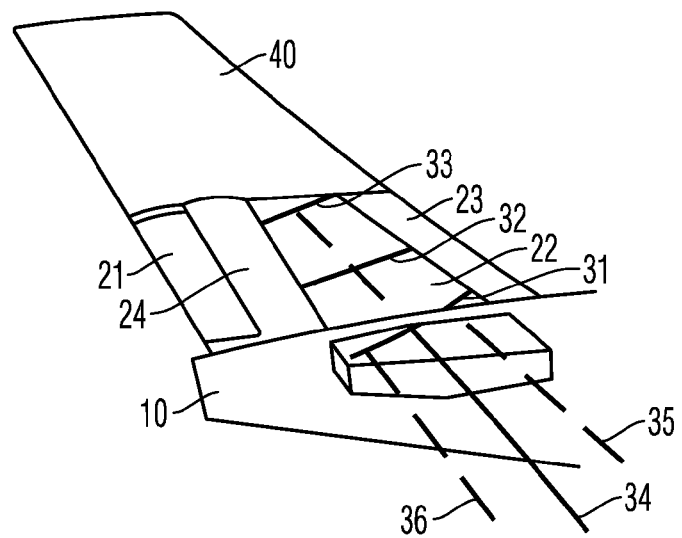
FIGS. 3a) and b) respectively show a side view and a plan view of that part of the horizontal stabilizer according to the invention that is shown in FIG. 2, in order to explain actuator devices for its movement.
Figure 3B:
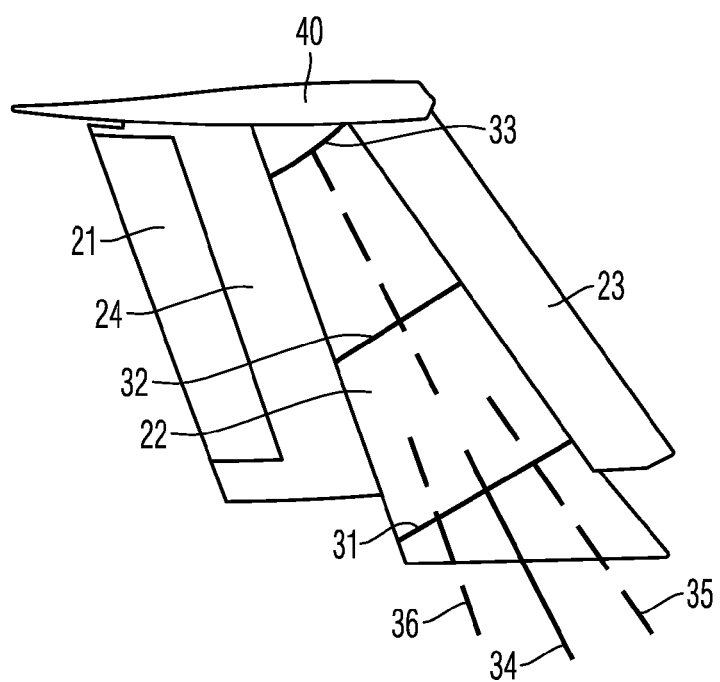

FIGS. 3a) and b) respectively show a side view and a plan view of details of actuator devices which are provided for movement of the movable areas 23, 24 in the sense of trimming the horizontal stabilizer 20. The movable areas 23, 24 may be operated by a common actuator or by separate actuators. In the illustrated exemplary embodiment, the actuator devices comprise a plurality of drive stations 31, 32, 33, which are coupled between the load-bearing structure 22 and the movable areas 23 and 24. In the illustrated exemplary embodiment, the actuator devices comprise torsion shafts 34 and 35, 36, which are coupled between the drive stations 31, 32, 33 and a central drive device provided in the fuselage 10.

As shown in FIGS. 3a) and b), when one actuator device is provided, which is used to move the movable areas 23, 24 together, a single central torsion shaft 34 is provided and is coupled to a central drive unit, which is provided in the fuselage 10 of the aircraft, in order to jointly move the movable areas 23, 24. On the other hand, two torsion shafts 35, 36 may also be provided, which are coupled on the one hand to actuator devices which are in each case provided separately for the movable areas 23, 24 and on the other hand to one or two central drive units, which are each provided in the fuselage 10 of the aircraft. Alternatively, the drive stations 31, 32, 33 of the movable areas 23, 24 can also be coupled to individual drive units and may be driven by them, with these drive units being accommodated in the elevator itself.

As shown in FIGS. 1 to 4, vertical stabilizers 40 are provided at each of the outer ends of the horizontal stabilizer 20 in the illustrated exemplary embodiment, and are firmly connected to the fuselage 10 by the load-bearing structure. For this purpose, the load-bearing structure 22 extends to the outer end of the horizontal stabilizer 20, on each side, in the span direction.

In the illustrated exemplary embodiment, aircraft engines 60 are arranged on the upper face of the horizontal stabilizer 20 at the rearward end of the fuselage 10, and are predominantly acoustically screened in the direction of the ground by virtue of their position by the horizontal stabilizer 20, the vertical stabilizers 40 and the fuselage 10. This configuration makes it possible to significantly reduce the noise emitted from the engines 60.

The load-bearing structure 22, which provides a robust connection between the vertical stabilizers 40 and the fuselage 10, allows reliable absorption of all of the forces and moments which occur in the area of the horizontal stabilizer 20, and in particular at the vertical stabilizers 40.

One major advantage of the trimmable horizontal stabilizer according to the invention is that the rotary drive formed by the torsion shafts 34, 35, 36 for the movable areas 23, 24 makes it possible to reduce the physical height of the fuselage structure in comparison to the conventional linear drive, in which all of the movement range must be accommodated in the fuselage.

The invention claimed is:

1. An aircraft, comprising a trimmable horizontal stabilizer, which is provided adjacent to a fuselage of the aircraft and has a predetermined aerodynamic profile, the horizontal stabilizer comprising:
   an elevator,
   a load-bearing structure, which extends in the span direction and is firmly connected to the fuselage of the aircraft, and
   movable areas, which are connected to the load-bearing structure such that they can be moved independently of the elevator in order to trim the horizontal stabilizer by varying the aerodynamic profile such that the horizontal stabilizer selectively produces positive or negative lift, or is neutral, the movable areas being arranged forward of the load-bearing structure in the aircraft longitudinal direction.

2. The aircraft according to claim 1, wherein the movable areas are arranged forward of and aft of the load-bearing structure in the aircraft longitudinal direction.

3. The aircraft according to claim 1, wherein the load-bearing structure is in the form of a wing box having skin surfaces, which form parts of the aerodynamic profile of the horizontal stabilizer, on its upper face and on its lower face.

4. The aircraft according to claim 3, wherein the movable areas are in the form of flaps which are connected by hinges to the load-bearing structure.

5. The aircraft according to claim 4, wherein the movable areas have rigid skin surfaces.

6. The aircraft according to claim 4, wherein the movable areas have a skin surface which merges into the skin surface of the load-bearing structure and which is flexible at least at the junction with the skin surface of the load-bearing structure.

7. The aircraft according to claim 1, wherein the movable areas are in the form of areas with a flexibly variable profile and have a flexible skin surface.

8. The aircraft according to claim 1, wherein the movable areas can be moved by a common actuator.

9. The aircraft according to claim 1, wherein the movable areas can be moved by separate actuators.

10. The aircraft according to claim 8, wherein the actuators comprise a plurality of drive stations, which are coupled between the load-bearing structure and the movable areas.

11. The aircraft according to claim 10, wherein the actuators comprise torsion shafts which are coupled between the drive stations and a central drive unit which is provided in the fuselage of the aircraft.

12. The aircraft according to claim 10, wherein the drive stations are coupled to individual drive units provided in the elevator.

13. The aircraft according to claim 2, wherein the elevator is provided at the rearward end of the movable area arranged aft of the load-bearing structure.

14. The aircraft according to claim 1, wherein the elevator is provided at the rearward end of the load-bearing structure.

15. The aircraft according to claim 1, wherein the load-bearing structure extends as far as the outer end of the horizontal stabilizer in the span direction.

16. The aircraft according to claim 15, wherein vertical stabilizers are provided at the outer ends of the horizontal stabilizer and are firmly connected to the fuselage by means of the load-bearing structure.

17. A trimmable horizontal stabilizer, which is provided adjacent to a fuselage of an aircraft and has a predetermined aerodynamic profile, the horizontal stabilizer comprising:
   an elevator,
   a load-bearing structure, which extends in the span direction and is firmly connected to the fuselage of the aircraft, and
   movable areas, which are connected to the load-bearing structure such that they can be moved independently of the elevator in order to trim the horizontal stabilizer by varying the aerodynamic profile, the movable areas being arranged forward of the load-bearing structure in the aircraft longitudinal direction,
   the load-bearing structure being in the form of a wing box having skin surfaces, which form parts of the aerodynamic profile of the horizontal stabilizer, on its upper face and on its lower face, and
   wherein the movable areas are in the form of flaps which are connected by hinges to the load-bearing structure.

18. A trimmable horizontal stabilizer, which is provided adjacent to a fuselage of an aircraft and has a predetermined aerodynamic profile, the horizontal stabilizer comprising:
   an elevator,
   a load-bearing structure, which extends in the span direction and is firmly connected to the fuselage of the aircraft, and
   movable areas, which are connected to the load-bearing structure such that they can be moved independently of the elevator in order to trim the horizontal stabilizer by varying the aerodynamic profile, the movable areas being arranged forward of the load-bearing structure in the aircraft longitudinal direction,
   wherein the movable areas can be moved by a common actuator, and
   wherein the actuators comprise a plurality of drive stations, which are coupled between the load-bearing structure and the movable areas.

19. The trimmable horizontal stabilizer according to claim 18, wherein the actuators comprise torsion shafts which are coupled between the drive stations and a central drive unit which is provided in the fuselage of the aircraft.

20. The trimmable horizontal stabilizer according to claim 18, wherein the drive stations are coupled to individual drive units provided in the elevator.

* * * * *